United States Patent [19]

Chang

[11] Patent Number: 4,904,038
[45] Date of Patent: Feb. 27, 1990

[54] GUIDED WAVE OPTICAL FREQUENCY SHIFTER

[75] Inventor: Chin-Lung Chang, Woodland Hills, Calif.

[73] Assignee: Litton Systems, Inc., Beverly Hills, Calif.

[21] Appl. No.: 615,111

[22] Filed: May 30, 1984

[51] Int. Cl.$^4$ ............................................. G02B 6/10
[52] U.S. Cl. .................................................. 350/96.14
[58] Field of Search ............... 350/96.11, 96.12, 96.13, 350/96.14, 96.15, 353, 371; 332/7, 51; 324/72, 96, 244; 356/350, 351

[56] References Cited

U.S. PATENT DOCUMENTS

| 4,153,328 | 5/1979 | Wang | 350/96.15 |
| 4,265,541 | 5/1981 | Leclerc et al. | 350/96.14 |
| 4,384,760 | 5/1983 | Alferness | 350/96.14 |

FOREIGN PATENT DOCUMENTS

| 2533714 | 3/1984 | France | 350/96.14 |
| 56-150724 | 11/1981 | Japan |  |

OTHER PUBLICATIONS

Kingston et al., Appl. Phys. Lett., 42(9), 1 May 1983, "Broadband Guided-Wave Optical Frequency Translator Using an Electro-Optical Bragg Array", pp. 759-761.

Heismann et al., IEEE J. of Quantum Electronics, QE-18, No. 4, Apr. 1982, "Integrated-Optical Single-Sideband Modulator and Phase Shifter", pp. 767-771.

*Primary Examiner*—William L. Sikes
*Assistant Examiner*—Frank González
*Attorney, Agent, or Firm*—Lynn & Lynn

[57] ABSTRACT

This invention is a frequency shifter for receiving an optical carrier signal input and producing an output including a sideband that is shifted in frequency from the carrier. The frequency shifter includes an optical waveguide formed in a substrate of an electro-optically active material such as lithium niobate. A plurality of electrodes formed on the substrate cooperate with a signal generator to apply two perpendicular electric fields to the optical waveguide. The resultant of the two fields is a rotating electric field which produces a rotating birefringence in the optical waveguide. The rotating birefringence acts as a rotating wave plate, which shifts the frequency of optical signals input to the optical waveguide. The wave plate is preferably a half wave plate, which converts all of the input optical energy into the sideband.

29 Claims, 3 Drawing Sheets

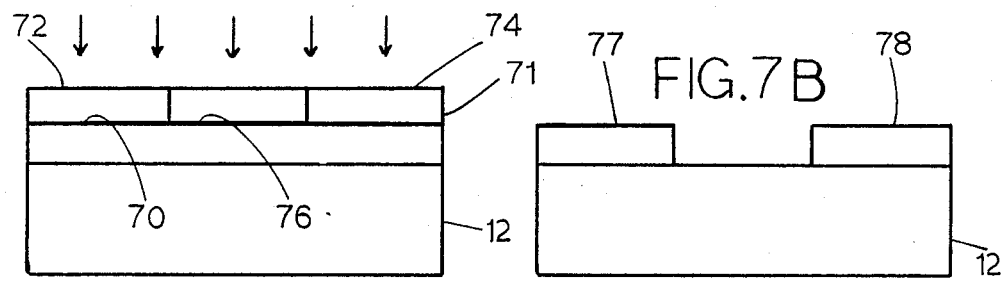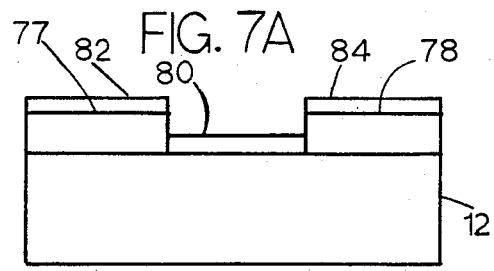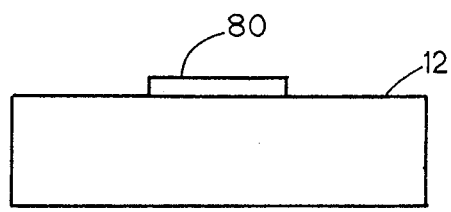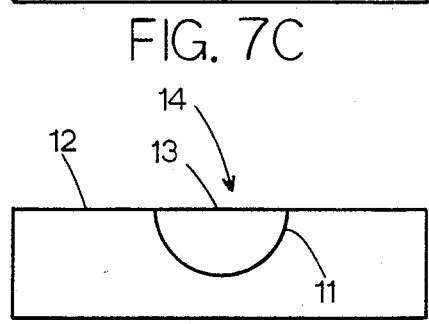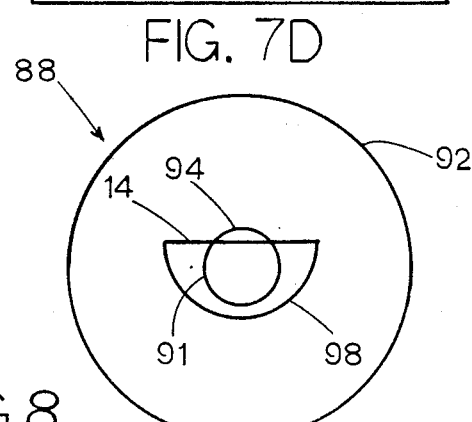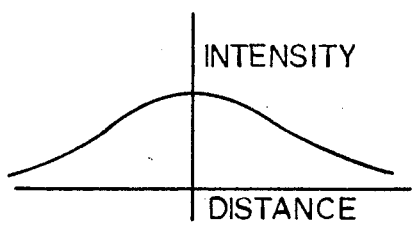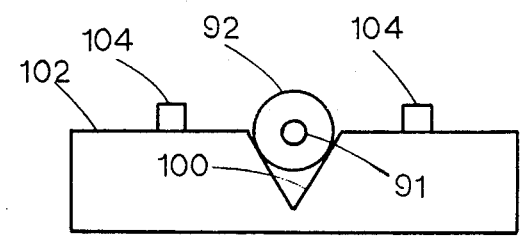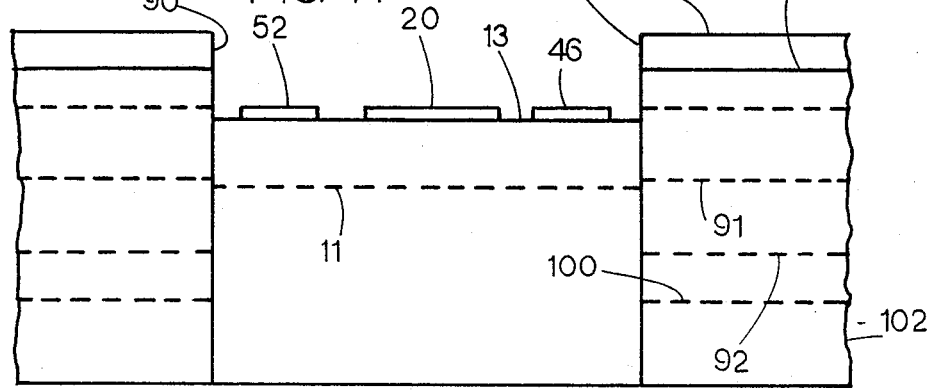

GUIDED WAVE OPTICAL FREQUENCY SHIFTER

BACKGROUND OF THE INVENTION

This invention relates generally to frequency shifters and particularly to optical frequency shifters. Still more particularly, this invention relates to a guided wave optical frequency shifter, which is suitable for use in an optical rotation sensing system. The frequency shifter uses electro-optic rotating half wave plate to shift the frequency of light input to a frequency suitable for the angular rotation rate to be detected.

A frequency shifter may be used to implement an optical rotation sensing system having the bandwidth required for aircraft navigation. Such systems must be capable of resolving rotation rates as low as 0.01 degrees per hour and as high as 1000 degrees per second. The ratio of the upper limit and the lower limit to be measured is approximately $10^9$.

Fiber optic ring interferometers have proven to be particularly useful for rotation sensing. A fiber optic ring interferometer typically includes a loop of fiber optic material having counterpropagating light waves therein. After traversing the loop, the counterpropagating waves are combined so that they interfere to form an output signal. The intensity of the output signal is dependent upon the relative phase of the two waves. Rotation of the loop creates a relative phase difference between the two waves in accordance with the well-known Sagnac effect. The amount of phase difference is a function of the angular velocity of the loop so that the optical output signal produced by the interference of the counterpropagating waves varies in intensity as a function of the rotation rate of the loop. Rotation sensing is accomplished by detecting the optical output signal and processing the signal to determine the rotation rate. A frequency shifter may be included in the apparatus that processes the optical output signal to determine the amount of the Sagnac phase shift between the two waves.

The frequency shifter must have a bandwidth comparable to that of a suitable light source used to introduce counterpropagating light waves in the loop. A superluminous diode having coherent light output in a wavelength band of about 100 nm has been found to be a suitable light source for an optical rotation sensing system. Therefore, a suitable frequency shifter must be capable of shifting an input optical beam by at least 50 nm above and below the carrier wavelength. Previously available frequency shifters have bandwidths that are too narrow for aircraft guidance systems.

A typical optical frequency shifter uses an acoustic wave to form a moving grating. The light be to be shifted in frequency impinges upon the acoustic wave. The alternating regions of condensation and rarefaction in the acoustic wave act as a diffraction grating having a grating spacing equal to the wavelength of the acoustic wave. The grating is moving at the acoustic wave velocity and shifts the incident optical beam in frequency by means of the Doppler effect. The acoustooptic frequency shifter has a bandwidth of only about $2\text{Å}=0.2$ nm. Acoustooptic frequency shifters typically have efficiencies of about 80%, but the efficiency varies with the frequency and the amount of frequency shift. A frequency shifter in an optical rotation sensing system should have a conversion efficiency that is invariant with respect to changes in the amount of frequency shift required.

SUMMARY OF THE INVENTION

The present invention provides a frequency shifter that overcomes the deficiencies of previous frequency shifters in optical rotation sensing systems. The frequency shifter of the present invention provides means for shifting the frequency of input optical signals by amounts ranging from zero to about 1.3 GHz with switching times of about one nanosecond. The efficiency varies only by about 1 dB over a 1 GHz bandwidth. Therefore, the shift in frequency covers the entire range of interest in optical rotation sensing systems.

The present invention includes an optical waveguide and a plurality of electrodes formed on a substrate of an electro-optically active material, such as lithium niobate. The electrodes are arranged to apply two perpendicular electric fields to a length of the optical waveguide. The phase of the fields is controlled so that the resultant of the two perpendicular fields is a rotating electric field vector. Application of an electric field to the electro-optically active lithium niobate changes the refractive indices thereof. Proper choice of the electrode length, spacing and voltage applied thereto causes the optical waveguide to behave as a half wave retardation plate that rotates at half the frequency of the voltage applied to the electrodes.

The invention further includes a quarter wave plate at each end of the half wave plate to ensure that the optical signal input to the halfwave plate is circularly polarized. The circularly polarized wave input to the half wave plate is frequency shifted from the carrier frequency by an amount f, where f is the frequency of the voltage applied to the electrodes. The shift in frequency produces a sideband that has a frequency either greater than or less than the carrier frequency, depending upon the sense of the circularly polarized input wave and the direction of rotation of the half wave plate.

In a preferred embodiment a first electrode cooperates with a grounded electrode to form an electric field through the optical waveguide and parallel to the surface of the substrate. A second electrode cooperates with the grounded electrode to form an electric field through the optical waveguide and perpendicular to the surface of the substrate. The magnitude of the voltage applied to the electrodes is adjusted to ensure that the two fields are of equal magnitude. The magnitude of the fields is preferably chosen to produce half wave retardation in an input optical signal of a selected wavelength.

The frequency shifter of the invention also has applications as a sensor and as a local oscillator in optical communications systems.

BRIEF DESCRIPTION OF THE DRAWINGS

FIGS. 7A–7E represent steps that may be used to fabricate the frequency shifter of FIG. 1;

FIG. 8 represents the overlap of the core of an optical fiber with the optical waveguide formed in the substrate of FIG. 1;

FIG. 9 graphically represents the power distribution in the optical fiber and the optical waveguide of FIGS. 1 and 8;

FIG. 10 illustrates an apparatus and method for positioning the fiber optic waveguide for butt coupling to the optical waveguide of FIGS. 1 and 8; and FIG. 11 is an elevation view illustrating butt coupling of the fiber optic waveguide of FIG. 10 with the optical waveguide of FIG. 1.

DESCRIPTION OF THE PREFERRED EMBODIMENT

FREQUENCY SHIFTER APPARATUS

Figure 1:
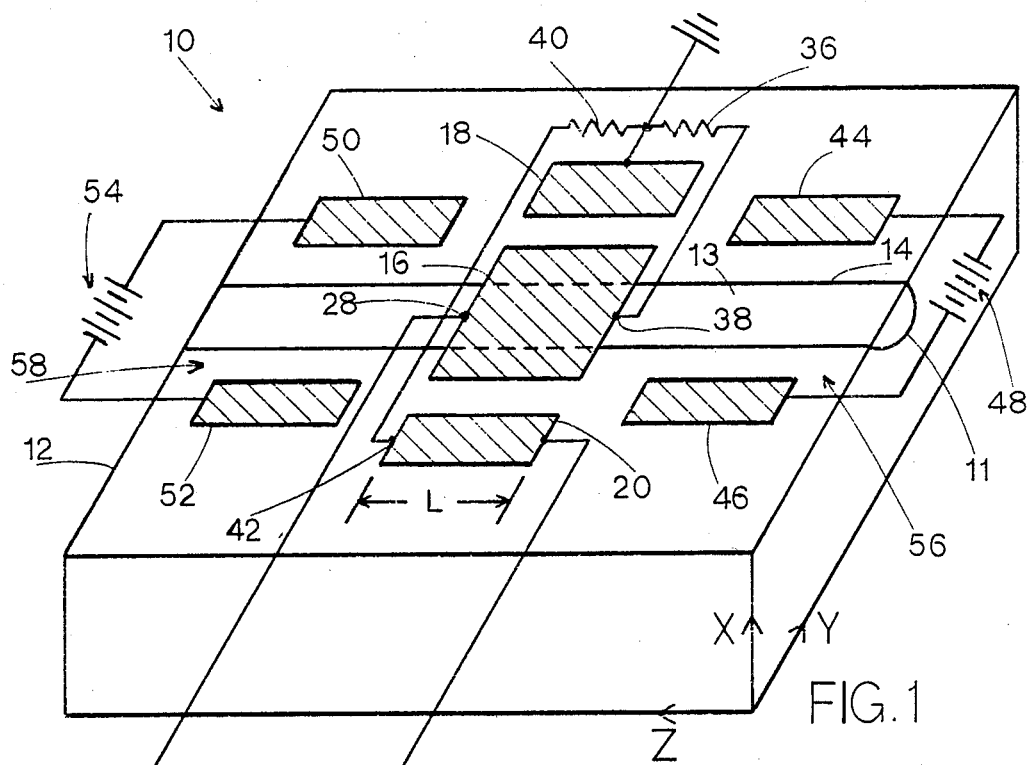
FIG. 1 is an isometric view of the frequency shifter of the present invention including electrodes formed on a substrate and including a schematic representation of electrical circuitry used to apply voltage to the electrodes.

Referring to FIG. 1, a frequency shifter 10 according to the present invention includes a substrate 12, preferably formed of an electro-optically active material, such as lithium niobate. For simplicity of illustration the substrate 12 is shown to have generally rectangular faces. An optical waveguide 14, which may be formed by doping a portion of the substrate 12 as explained hereinafter, extends the length of the substrate 12. For convenience the optical waveguide 14 is shown to be generally along a line parallel to and equidistant from a pair of opposite sides of the substrate 12. The optical waveguide 14, as shown in FIGS. 1, 7E and 11 preferably has an approximately semicircular cross section having a curved side 11 and a flat side 13, which lies in the plane of the substrate 12.

Figure 2:
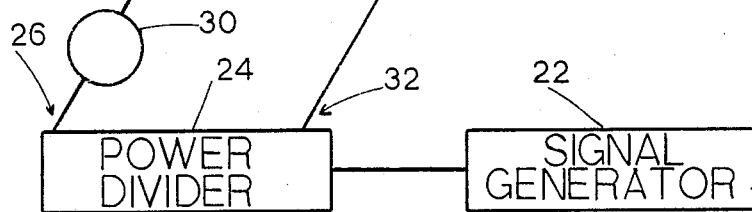
FIG. 2 is a cross sectional view of the electrodes of FIG. 1 showing an electric field parallel to the substrate.
Figure 2:
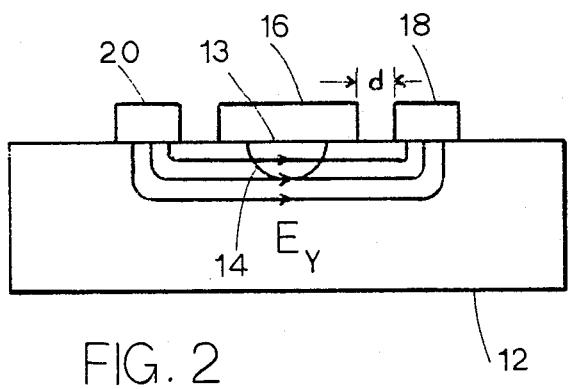
Figure 3:
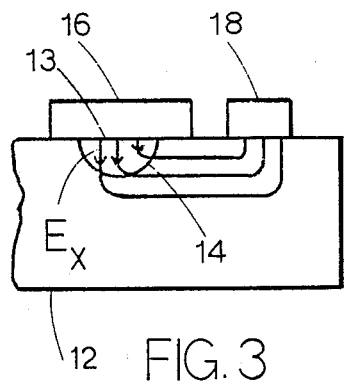
FIG. 3 is a partial cross sectional view taken along line 2—2 of FIG. 1 showing an electric field perpendicular to the substrate.

A plurality of electrodes 16, 18 and 20 are attached to the central portion of the substrate 12. The electrode 16, as shown in FIGS. 1–3 is preferably centered over the flat surface 13 of the semicircular optical waveguide 14. As shown in FIGS. 1 and 2, the electrodes 18 and 20 are spaced apart from the electrode 16 and are generally coplanar therewith. The electrodes 16, 18 and 20 are preferably rectangles of approximately of equal length, L, and are positioned in parallel alignment with their ends being substantially colinear. The electrodes 18 and 20 are preferably each spaced a distance, d, from the central electrode 16. In a typical construction of the frequency shifter 10 the length L is about 1.0 cm, and the separation d is about 10 μm.

As shown in FIG. 1, the electrode 18 is preferably connected to ground potential. A signal generator 22 supplies electrical power to the electrodes 16 and 20 through a power divider 24. The power divider 24 includes means well known in the art for providing two output voltage signals that preferably are substantially equal in magnitude but differing in phase by 90 degrees. The power divider 24 has a first output terminal 26 that is connected to an end 28 of the electrode 16 through an attenuator 30. An output 32 of the power divider 24 is connected directly to the electrode 20.

A resistance 36 is connected between an end 38 of the electrode 16 and ground potential, and a resistance 40 is connected between an end 42 of the electrode 20 and ground. The resistances 36 and 40 serve to match the electrical load of the electrodes 16, 18 and 20 to the impedance of the signal generator 22. The resistances 36 and 40 typically are each about 50 ohms.

A pair of electrodes 44 and 46 are positioned on opposite sides of the optical waveguide 14 and spaced apart along the length thereof from the electrodes 16, 18 and 20. The electrode 46 is shown to be grounded, and the electrode 46 is connected to a voltage source 48, which is preferably an adjustable dc source. A pair of electrodes 50 and 52 are positioned on opposite sides of the optical waveguide 14 at the opposite ends of the electrodes 16, 18 and 20 from the electrodes 44 and 46. The electrode 52 is grounded, and the electrode 50 is connected to a voltage source 54 that is similar to the voltage source 48.

Referring to FIG. 2, the electrodes 20 and 18 are arranged so that application of a positive voltage to the electrode 20 creates an electric field designated $E_y$ that extends from the electrode 20 through the optical waveguide 14 to the electrode 18. It is a well known boundary condition from electromagnetic field theory that at a conductor-dielectric interface, such as the interfaces between the electrodes 16, 18 and 20, the electric field is perpendicular to the conductor. Therefore, the electric field near the electrodes 18 and 20 is perpendicular thereto. Since the electrodes 18 and 20 are coplanar, the electric field $E_y$ in the region of the optical waveguide 14 is essentially parallel to the surface of the substrate 12.

Referring to FIG. 3, the electric field designated $E_x$ between the electrodes 16 and 18 is also perpendicular to the interfaces of the substrate 12 with the electrodes 16 and 18. Since the electrode 16 is directly over the flat surface optical waveguide 14, the electric field $E_x$ is essentially perpendicular thereto. Therefore, the electrodes 16, 18 and 20 provide means for forming two mutually perpendicular electric fields in the optical waveguide 14. The spacing between the electrodes 16 and 18 is less that between the electrodes 18 and 20. In order to form the frequency shifter 10 it is desirable that the electric fields $E_x$ and $E_y$ have equal magnitudes. The attenuator 30 is used to adjust the voltage applied to the electrode 16 to equalize the field components.

The result of the above described structure of the frequency shifter 10 is the application of equal magnitude perpendicular electric field components that are 90 degrees out of phase with the optical waveguide 14. Such field components have a resultant that is an electric field vector rotating at an angular frequency equal to the frequency of the signal applied to the electrodes 16, 18 and 20 by the signal generator 22. Since the doped lithium niobate optical waveguide is electro-optically active, the rotating electric field therein produces a rotating change in the index of refraction of the optical waveguide 14. Proper choices of the electric field magnitude, electrode length and electrode spacing causes the change in refractive index to make the portion of the optical waveguide 14 covered by the electrode 16 to act as a rotating half wave plate.

The voltage sources 48 and 52 are adjusted to that the electrode pairs 44, 46 and 50, 52, respectively, each act as quarter wave plates.

Theory and Method of Operation

The refractive index ellipsoid of the uniaxial crystal lithium niobate is given by $$(1/n_o^2)x^2 + (1/n_o^2)y^2 + (1/n_e^2)z^2 = 1 \quad (1)$$

where $n_o$ is the ordinary refractive index and $n_e$ is the extraordinary refractive index. If the laser light propagates along the z-axis, then there is only one allowed refractive index for the two orthogonal polarization states propagating in the optical waveguide 14, which means that there is no birefringence in the optical waveguide 14 in the absence of an externally applied electric field. The refractive index ellipsoid is deformed and rotated when an external electric field is applied to the crystal. Therefore, application of an external electric field to the crystal changes both the refractive index of the crystal and the polarization of laser light propagating therein.

The new refractive index ellipsoid calculated from the electro-optic tensor of lithium niobate is expressed as $$(1/n_o^2 - \gamma_{22} E_y)x^2 + (1/n_o^2 + \gamma_{22} E_y)y^2 + (1/n_e^2)z^2 + 2\gamma_{42}E_y yz + 2\gamma_{42}E_x xz - 2\gamma_{22}E_x xy = 1 \quad (2)$$

where $\gamma_{ij}$ are the linear electro-optic coefficients and $E_x$ and $E_y$ are the applied electric fields in the x- and y-directions, respectively. Assuming the direction of propagation to be the z-axis, then $z=0$, and Equation (2) reduces to $$(1/n_o^2 \gamma_{22}E_y)x^2 + (1/n_o^2 + \gamma h d 22E_y)y^2 - 2\gamma_{22}E_x xy = 1 \quad (3)$$

The coordinate system is next transformed to a principal axis system to eliminate the last term of Equation (3) to obtain an expression for the ellipsoid in which there are no terms involving products of the different variables x and y. The desired coordinate transformation is a rotation of the coordinates in the x-y plane through an angle $\theta$ to obtain $$(1/n_o^2 - \gamma_{22}E_y \cos 2\theta - \gamma_{22}E_x \sin 2\theta)x'^2 + (1/n_o^2 + \gamma_{22}E_y \cos 2\theta + \gamma_{22}E_x \sin 2\theta)y'^2 = 1 \quad (4)$$

The angle of rotation is given by $$\theta = +\tfrac{1}{2} \tan^{-1}(E_x/E_y) \quad (5)$$

Thus the refractive indices of the optical waveguide 14 are given by $$n_{x'} = n_o + \tfrac{1}{2}n_o^3(\gamma_{22}E_y \cos 2\theta + \gamma_{22}E_x \sin 2\theta) \quad (6)$$

and $$n_{y'} = n_o - \tfrac{1}{2}n_o^3(\gamma_{22}E_y \cos 2\theta + \gamma_{22}E_x \sin 2\theta) \quad (7)$$

The different expressions of Equations (6) and (7) for the refractive indices in the new principal axis coordinate system indicate that application of an electric field to the electro-optically active material induces birefringence therein. Light waves travelling in the birefringent optical waveguide 14 experience a phase retardation of $$T = (2\pi/\lambda)(n_{x'} - n_{y'}) \cdot L \quad (8)$$

$$T = 2\pi n_o^3 \gamma_{22}(L/\lambda)(E_y \cos 2\theta + E_x \sin 2\theta) \quad (9)$$

where L is the interaction length of the electrodes 16, 18 and 20 and $\lambda$ is the vacuum wavelength of the optical signal.

The half-wave voltage $V_\pi$ is defined as the voltage required to achieve a phase retardation of $\pi$ radians. Therefore, setting $\theta = \pi$ and $E_x = E_y = V_\pi/d$, the half wave voltage is $$V_\pi = \gamma d(2n^3 \gamma_{22} L)^{-1} \quad (10)$$

If the electric field components are sinusoids of equal amplitude E but differing in phase by 90 degrees as required to produce a resultant rotating electric field vector in the optical waveguide 14, the field components may be expressed as $$E_x = E \sin \omega t \quad (11)$$

and $$E_y = E \cos \omega t. \quad (12)$$

Using Equations (11) and (12) in Equation (5) for the angle of rotation gives $$\theta = \tfrac{1}{2} \tan^{-1}(\sin \omega t / \cos \omega t) \quad (13)$$

$$\theta = \tfrac{1}{2} \tan^{-1} \tan \omega t \quad (14)$$

$$\theta = \tfrac{1}{2}\omega t \quad (15)$$

Therefore, the angle of rotation of the principal axis system for the states that are allowed to propagate in the optical waveguide 14 is determined by the frequency of the signal applied to the electrodes 16, 18 and 20 from the signal generator 22. Differentiating Equation (15) with respect to time shows that the angular velocity of the rotating waveplate is $$\dot{\theta} = \tfrac{1}{2}\omega \quad (16)$$

Figure 6:
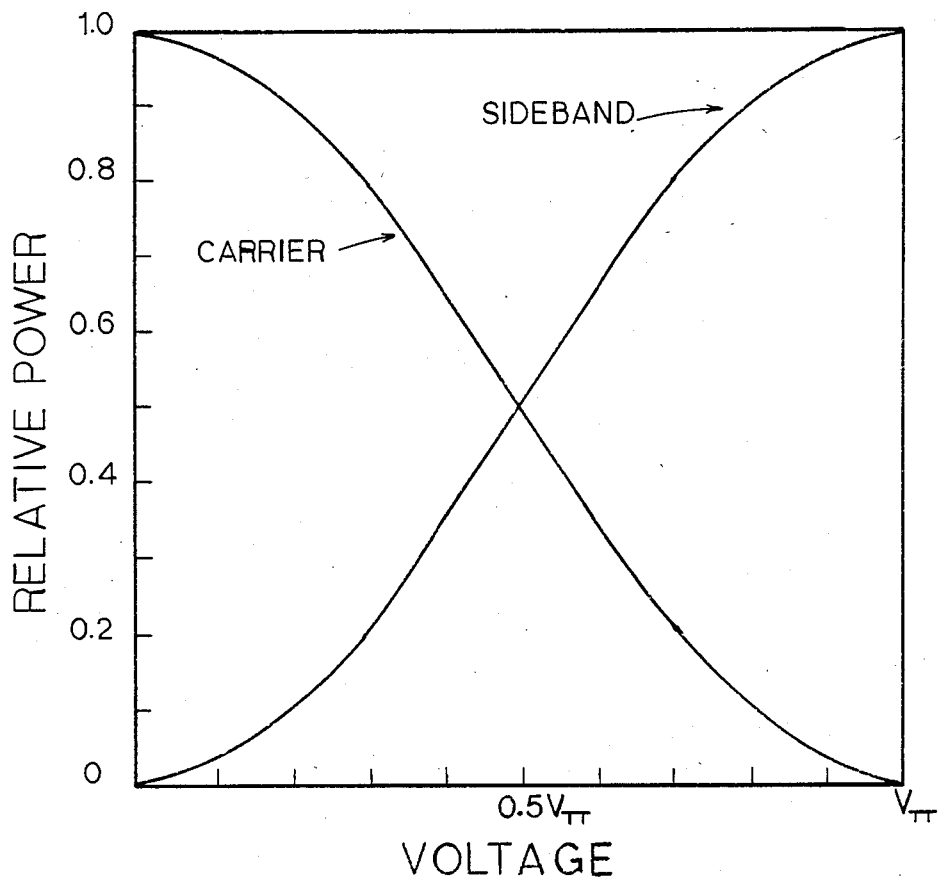
FIG. 6 is a graph showing percentages of carrier and sideband in the frequency shifter of FIG. 1 as functions of voltage applied to the electrodes.

If a rotating electric field with amplitude corresponding to the half wave voltage is applied to the optical waveguide 14, then the output of the frequency shifter 10 in response to an input optical signal having a frequency f is an optical signal that is frequency shifted from the input, or carrier, signal by $\pm f_m$ where $f_m$ is the frequency of the applied voltage from the signal generator 22. The frequency of the sideband depends upon the direction of rotation of the waveplate relative to the direction of the circular polarization of the input wave. If the voltage is equal to the half-wave voltage, then there is a complete conversion of the carrier into the sideband. FIG. 6 graphically illustrates the relative optical power in the carrier and sideband as the voltage varies from zero to the voltage required for half wave retardation.

Figure 4:
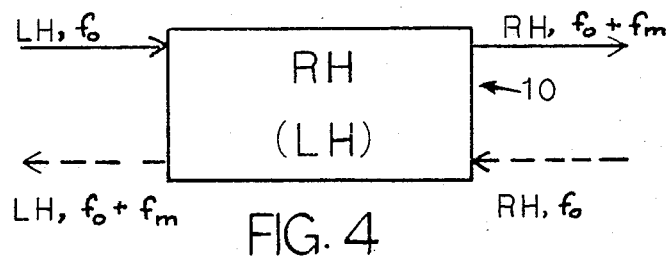
FIG. 4 is a schematic representation of a rotating half wave plate.
Figure 5:
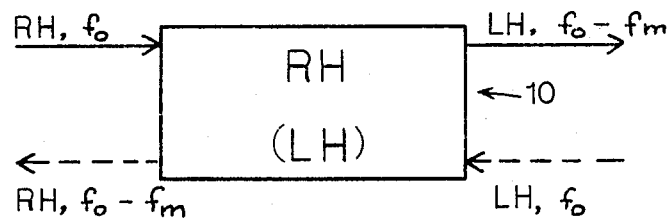
FIG. 5 is a second schematic representation of a rotating half wave plate.

FIG. 4 is a simple block diagram of the frequency shifter 10 in which the direction of rotation of the waveplate is clockwise or right hand when viewed from the left. A left circularly polarized input signal from the left having frequency $f_o$ results in a right circularly polarized sideband having frequency $f_o + f_m$. A right circularly polarized signal input from the right is shifted to a sideband having frequency $f_o + f_m$ and left circular polarization. FIG. 5 shows a right circularly polarized input of from the left being shifted to an sideband having left circular polarization and frequency $f_o - f_m$. A left circular polarized input from the right is shifted to a sideband having right circular polarization and frequency $f_o-f_m$. If counterpropagating beams are input to the frequency shifter 10, as in an optical gyroscope, for example, the rotation senses of the waveplate for the two beams are mirror images of one another so that one wave is shifted up in frequency while the other is shifted down.

The bandwidth of the frequency shifter 10 is given by $$f_{3db}=1/(\pi RC) \tag{17}$$

where C is the static capacitance associated with the electrodes 16, 18 and 20 and R is the resistance between each of the electrodes 16 and 18 and ground potential. In general the static capacitance is approximately 1 pf, so that a termination resistance results in a bandwidth of 1.3 GHz. The driving power of the frequency shifter 10 is given by $$P=V^2/(2R). \tag{18}$$

If 100% conversion of the carrier into the sideband is desired, then the driving electric power is given by $$P=V^2_\pi/(2R) \tag{19}$$

must be applied to the electrodes 16, 18 and 20, where $V_\pi$ is given by Equation 10 as explained above. The wavelength, $\lambda$, is 6328 Å. The distance, d, between the electrodes 16 and 18 is about 10 $\mu$m. Lithium niobate has an index of refraction of 2.29, and its linear electro-optic coefficient $\gamma_{22}$ is $3.4 \times 10$ m/V. The electrodes 16, 18 and 20 are each about 1.0 cm in length. The above parameters give a half-wave voltage of about 7.7 volts, which results in a driving power of about 593 mw for each of the electrodes, which are connected to the signal source 22. Therefore, a total power of about a watt is required to operate the frequency shifter 10. The above parameters are exemplary only and are not critical to the operation of the frequency shifter 10. The power requirement could be reduced by decreasing the distance between the electrodes 16, 18 and 20 and by increasing the length thereof.

The optical waves input to the halfwave plate is preferably circularly polarized. Passage of a signal having a linear polarization through one of the quarter wave plates 56 or 58 ensures that the input to the half wave plate has the desired circular polarization. If the input to the quarter wave plate 56, for example, is linearly polarized with its polarization being at 45 degrees from the positive x-axis, then the quarter wave plate 56 introduces a 90 degree phase difference in the waves of equal polarizations along both the x-axis and the y-axis.

Method of Construction

FIG. 7 and 9–11 illustrate process steps that may be employed to construct the frequency shifter 10 of FIG. 1.

FIGS. 7A–7E illustrate formation of the optical waveguide 14 in the substrate 12. Initially the substrate 12 is covered with a photoresist layer 70. A glass plate 71, called photomask, is placed on the photoresist layer 70. The plate 71 is prepared by using standard photoreduction techniques to generate a desired pattern on which portions 72 and 74 are opaque/and spaced apart to leave an elongate rectangular portion 76. The arrows of in FIG. 7A indicate ultraviolet (UV) light impinging upon the glass plate 71 and the exposed portion 76 of the photoresist layer 70. The portions 72 and 74 are opaque to the UV light affects so that the UV light only the exposed portion 76 of the photoresist layer 70. Referring to FIG. 7B, placing the photoresist portion 76 in a suitable developer leaves attached to the substrate 12 only a pair of photoresist portions 77 and 78, which are immediately subjacent the glass plates 72 and 74, respectively.

Referring to FIG. 7C, a titanium layer 80 is formed on the substrate 12 where the photoresist portion 76 was removed therefrom. The titanium layer 80 may be formed by any suitable method, such as evaporation, for forming a thin metallic film. The remaining photoresist portions 77 and 78 also have titanium layers 82 and 84 formed thereon, but the layer 80 has essentially parallel sides sharply defined by the edges of the photoresist layers 77 and 78.

Placing the substrate 12 in a solvent such as acetone removes the photoresist portions 77 and 78, leaving only the well-defined layer 80 of titanium, shown in FIG. 7D, on the substrate 12. The layer 80 has a substantially rectangular cross section as viewed from the end as in FIG. 7D. The substrate 12 with the titanium layer 80 thereon is placed in a high temperature oven, as is well-known in the art, and baked a time sufficient to cause diffussion of $Ti^{++}$ ions into the substrate 12 to form the generally semicircular waveguide 14 shown in FIG. 7E.

The frequency shifter 10 may be coupled between a pair of ends 88 and 90 of fiber optic material to receive an optical signal from one end, for example, the end 88, shift the frequency of the signal and couple the frequency shifted output into the other end 90. FIG. 8 illustrates the primary considerations involved in coupling the optical waveguide 14 and a fiber end 88 having a core 91 and a cladding 92. Ordinarily it is desirable to minimize the insertion loss caused by splicing the frequency shifter 14 between the ends 88 and 90. In the present application insertion loss is defined as the ratio of the power carried by the side band signal to the power in the input carrier signal. The optical waveguide 14 and the core 90 are dimensioned to maximize the area of overlap therebetween to minimize the insertion loss. A small portion 94 of the fiber extends beyond the linear edge of the semicircular cross section of the optical waveguide 14, and a portion 98 of the optical waveguide 14 extends beyond the circular perimeter of the core 91. For a given diameter of the core 91, careful control of the processes used to form the optical waveguide 14 limits insertion loss to 5 dB or less. The insertion loss may be maintained at relatively low values because the distribution of optical power in both the fiber 88 and the optical waveguide are similarly shaped Gaussian distributions as shown in FIG. 9.

The diameter of the cladding 92 is much larger than that of the core 91, which facilitates handling of the fiber 88 to match the core 90 to the optical waveguide 14. Referring to FIG. 10, the fiber 88 may be conveniently mounted in a V-shaped groove 100 in a substrate 102, which may include a plurality of alignment projections 104. As shown in FIG. 11, the substrates 12 and 102 may be positioned to place the core 91 and the optical waveguide 14 in the desired alignment for butt coupling. A suitable adhesive, such as an epoxy resin may be used to maintain the butt coupling between the fiber 88 and the optical waveguide 14.

What is claimed is:

1. A frequency shifter for receiving an optical carrier signal having a carrier frequency and for providing a sideband output that is shifted in frequency from the carrier frequency, comprising
- waveguide means comprising an optical waveguide formed in an electro-optically active material for guiding an optical signal in the electro-optically active material; and
- means for forming a rotating waveplate in said waveguide means to shift the frequency of the optical signal to provide a sideband having a frequency shift dependant upon the rotation rate of said rotating waveplate the rotating waveplate forming means including;
- a first electrode adjacent a length of the optical waveguide;
- a second electrode spaced apart from said optical waveguide proximate a first side of said first electrode;
- a third electrode spaced apart from said optical waveguide proximate a second side of said first electrode;
- means for applying a first voltage between said first electrode and said third electrode to form a first electric field extending between said first and third electrodes through said optical waveguide; and
- means for applying a second voltage between said second electrode and said third electrode to form a second electric field extending between said second and third electrodes through said optical waveguide perpendicular to said first electric field, the first and second voltages having a phase relationship such that the first and second electric fields form a resultant field that rotates around a length of the optical waveguide 2. The frequency shifter of claim 1, wherein said rotating waveplate is a half wave retardation plate.

3. The frequency shifter of claim 1, wherein said means for applying a rotating electric field includes:
- means for applying a first electric field perpendicular to said length of said optical waveguide; and
- means for applying a second electric field perpendicular to both the first electric field and said length of said optical waveguide, said first and second electric fields having equal magnitudes and a phase difference of 90 degrees, the rotating electric field being the resultant of said first and second electric fields.

4. The frequency shifter of claim 1, further including:
- a signal generator;
- a power divider connected to receive the output of said signal generator, said power divider providing a first output voltage to said first electrode and a second output voltage to said second electrode, said first and second output voltages differing in phase by 90 degrees; and
- means for adjusting the relative magnitude of said first and second voltages so that said first and second electric fields have equal magnitudes.

5. The frequency shifter of claim 4, further including:
- a first quarter wave retardation plate formed in said optical waveguide proximate a first end thereof; and
- a second quarter wave retardation plate formed in said optical waveguide proximate a second end thereof, said first and second quarter wave retardation plates adjusting the polarization of optical signals input thereto to provide circularly polarized optical signals for input to said rotating waveplate.

6. A frequency shifter for receiving an optical carrier signal having a carrier frequency and providing a sideband output that is shifted in frequency from the carrier frequency, comprising:
- waveguide means comprising an optical waveguide formed in an electro-optically active material for guiding an optical signal in the electro-optically active material; and
- means for forming a rotating half wave retardation waveplate in said waveguide means to shift the frequency of the signal to provide a sideband having a frequency shift dependant upon the rotation rate of said waveplate;
- a first quarter wave retardation plate formed in said waveguide means proximate a first end thereof; and
- a second quarter wave retardation plate formed in said waveguide means proximate a second end thereof, said first and second quarter wave retardation plates adjusting the polarization of optical signals input thereto to provide circularly polarized optical signals for input to said rotating half wave retardation waveplate.

7. The frequency shifter of claim 6, wherein said electro-optically active material is lithium niobate.

8. The frequency shifter of claim 7, wherein said waveguide means comprises titanium ions diffused in a region of the electro-optically active material.

9. A frequency shifter for shifting the frequency of an optical carrier from a carrier frequency to a sideband frequency, comprising:
- a substrate formed of an electro-optically active material;
- an optical waveguide formed in said substrate;
- a first electrode attached to a surface of said substrate, said first electrode covering a length of said optical waveguide;
- a second electrode attached to the surface of said substrate proximate said first electrode;
- a third electrode attached to said substrate;
- means for applying a first voltage between said first electrode an said second electrode to form a first electric field through said optical waveguide; and
- means for applying a second voltage between said second electrode and said third electrode to form a second electric field through said optical waveguide and perpendicular to said first electric field, the first and second voltages having a phase difference of 90 degrees so that the resultant of said first and second electric fields is a rotating electric field vector in said length of optical waveguide.

10. A frequency shifter for shifting the frequency of an optical carrier signal from a carrier frequency to a sideband frequency, comprising:
- an optical waveguide formed in an electro-optically active material;
- means for introducing an single made optical carrier signal into said optical waveguide; and
- means for inducing a rotating birefringence in said optical waveguide, said rotating birefringence shifting the frequency of said carrier signal by an amount dependent upon the rotation rate of said rotating birefringence.

11. The frequency shifter of claim 10, wherein said means for applying a rotating birefringence includes:
- means for applying a first electric field to said length of said optical waveguide; and
- means for applying a second electric field to said length of optical waveguide perpendicular to the first electric field, said first and second electric fields having equal magnitudes and a phase difference of 90 degrees to form a rotating electric field that is the resultant of said first and second electric fields.

12. The frequency shifter of claim 11, wherein said electro-optically active material is lithium niobate.

13. The frequency shifter of claim 12, wherein said optical waveguide comprises titanium ions diffused in a region of said electro-optically active material.

14. A method for shifting the frequency of an optical carrier signal from a carrier frequency to a sideband frequency, comprising the steps of:
 forming an optical waveguide in an electro-optically active material;
 introducing an optical signal comprising a single mode of electromagnetic energy at the carrier frequency into the optical waveguide; and
 forming a rotating waveplate in a length of the optical waveguide.

15. The method of claim 14, further comprising the step of forming the waveplate to cause half wave retardation in the carrier signal.

16. The method of claim 14, wherein the step of forming a rotating waveplate includes the steps of:
 applying a first electric field to the optical waveguide; and
 applying a second electric field to the optical waveguide perpendicular to the first electric field and 90 degrees out of phase therewith.

17. The method of claim 14, wherein the step of forming a rotating waveplate includes step of forming a rotating electric field in the optical waveguide.

18. The method of claim 17, wherein the step of forming a rotating electric field in the optical waveguide includes the steps of:
 applying a first electric field to the optical waveguide; and
 applying a second electric field to the optical waveguide perpendicular to the first electric field and 90 degrees out of phase therewith.

19. The method of claim 18, wherein the step of forming a rotating electric field includes the steps of:
 forming the optical waveguide on a substrate of an electro-optically active material;
 depositing a first electrode on the substrate over a length of the optical waveguide;
 depositing a second electrode spaced apart from the first electrode on a first side thereof;
 depositing a third electrode spaced apart from the first electrode on a second side thereof;
 applying a first voltage to the first electrode to form a first electric field through the optical waveguide;
 applying a second voltage to the second electrode to form a second electric field through the optical waveguide perpendicular to the first electric field with the same magnitude as the first electric field, the first and second voltages having a phase difference of 90 degrees so that the resultant field rotates relative to the optical waveguide.

20. The method of claim 14, further including the steps of:
 introducing an optical carrier signal into the optical waveguide;
 inducing a rotating birefringence in the optical waveguide to produce a rotating waveplate therein for shifting the frequency of the carrier signal to form an output having a sideband frequency that is shifted from the carrier frequency by an amount dependent upon the rotation rate of the waveplate.

21. The method of claim 14, wherein the step of forming an optical waveguide includes the step of diffusing titanium ions into a region of a lithium niobate substrate.

22. A method for shifting the frequency of an optical carrier signal from a carrier frequency to a sideband frequency, comprising the steps of:
 forming an optical waveguide in an electro-optically active material;
 forming a rotating half waveplate in a length of the optical waveguide to cause halfwave retardation in the carrier signal by the steps of;
 depositing a first electrode on the substrate over a length of the optical waveguide;
 depositing a second electrode on the substrate spaced apart from the first electrode on a first side thereof;
 depositing a third electrode on the substrate spaced apart from the first electrode on a second side thereof;
 applying a first voltage to the first electrode to form a first electric field through the optical waveguide;
 applying a second voltagel between the second electrode and the third electrode to form a second electric field to the optical waveguide perpendicular to the first electric field with the same magnitude as the first electric field, the first and second voltages having a phase difference of 90° so that the resultant field rotates relative to the optical waveguide; and
 forming a quarter waveplate in the optical waveguide to circularly polarize the optical carrier signal input to the half waveplate.

23. A method for shifting the frequency of an optical carrier signal from a carrier frequency to a sideband frequency, comprising the steps of:
 forming an optical waveguide in an electro-optically active material;
 introducing a single mode optical carrier signal into the optical waveguide; and
 inducing a rotating birefringence in said optical waveguide to shift the carrier signal to a sideband frequency that is dependent upon the rotation rate of the birefringence.

24. The method of claim 23, wherein the step of forming an optical waveguide includes the step of diffusing titanium ions into a region of a lithium niobate substrate.

25. A method for forming an optical frequency shifter, comprising the steps of:
 forming an optical waveguide in an electro-optically active substrate;
 forming a first electrode on a surface of the substrate adjacent a length of the optical waveguide;
 forming a second electrode on the surface of the substrate spaced apart from and generally parallel to the length of the optical waveguide;
 forming a third electrode on the surface of the substrate spaced apart from and generally parallel to the length of the optical waveguide;
 applying a first voltage to the first electrode to form a first electric field through the optical waveguide; and
 applying a second voltage to the second and third electrodes 90 degrees out of phase with the first voltage to form a second electric field perpendicular to the first electric field so that the resultant electric field applied to the optical waveguide rotates at a predetermined rate about the optical waveguide.

26. A method for forming an optical frequency shifter, comprising the steps of:
  forming an optical waveguide in an electro-optically active substrate;
  forming a first electrode on a surface of the substrate adjacent a length of the optical waveguide;
  forming a second electrode on the surface of the substrate spaced apart from and generally parallel to the length of the optical waveguide;
  forming a third electrode on the substrate spaced apart from and parallel to the optical waveguide;
  applying a first voltage to the first electrode to form a first electric field through the optical waveguide; 90° out of phase with the first voltage to form a second electric field perpendicular to the first electric field so that the resultant electric field applied to the optical waveguide rotates at a predetermined rate about the optical waveguide;
  connecting the third electrode at ground potential so that the first electric field extends between the first and third electrodes and the second electric field extends between the second and third electrodes;
  forming a first quarter waveplate in the substrate adjacent a first end of the second electrode; and
  forming a second quarter waveplate in the substrate adjacent the other end of the second electrode to ensure that the optical signal incident upon the length of the optical waveguide under the second electrode is circularly polarized.

27. The method of claim 26, wherein the step of forming an optical waveguide includes the step of diffusing titanium ions into a region of a lithium niobate substrate.

28. A frequency shifter for receiving an optical carrier signal having a carrier frequency and providing a sideband output that is shifted in frequency from the carrier frequency, comprising:
  waveguide means comprising an optical waveguide for propagating an optical signal in an electroptically active material;
  means for introducing an optical signal comprising a single mode of electromagnetic energy into said waveguide means;
  means for applying a rotating electric field to a length of said optical waveguide to form a rotating waveplate in said waveguide means to shift the frequency of the optical signal from the carrier frequency to a sideband frequency.

29. A method for shifting the frequency of an optical carrier signal having a carrier frequency to a sideband frequency comprising the steps of:
  forming a waveguide in an electro-optically active material for guiding an optical signal in the electro-optically active material; and
  forming a rotating half wave retardation waveplate in said waveguide means to shift the frequency of the signal to provide a sideband having a frequency shift dependant upon the rotation rate of said waveplate;
  forming a first quarter wave retardation plate formed in said waveguide means proximate a first end thereof; and
  forming a second quarter wave retardation plate formed in said waveguide means proximate a second end thereof, said first and second quarter wave retardation plates adjusting the polarization of optical signals input thereto to provide circularly polarized optical signals for input to said rotating half wave retardation waveplate.

* * * * *